United States Patent [19]

Junkert et al.

[11] 4,456,390
[45] Jun. 26, 1984

[54] NONCONTACT TEMPERATURE MEASURING DEVICE

[75] Inventors: Kenneth G. Junkert, Woodland Hills; Henry P. Voznick, Arcadia, both of Calif.

[73] Assignee: Wahl Instruments, Inc., Culver City, Calif.

[21] Appl. No.: 315,343

[22] Filed: Oct. 26, 1981

[51] Int. Cl.³ ............................ G01J 5/16; G01J 5/26
[52] U.S. Cl. ................................. 374/128; 136/225; 330/9; 374/124; 374/129; 374/165; 374/178
[58] Field of Search ............... 374/124, 121, 112, 178, 374/171, 133, 179, 129, 128, 181; 330/9

[56] References Cited

U.S. PATENT DOCUMENTS

| | | | |
|---|---|---|---|
| 3,444,739 | 5/1969 | Treharne | 374/128 |
| 3,735,274 | 5/1973 | Nelson | 330/9 X |
| 3,777,568 | 12/1973 | Risgin et al. | 374/133 X |
| 3,793,630 | 2/1974 | Meijer | 374/171 X |
| 3,831,042 | 8/1974 | La Claire | 374/178 X |
| 4,005,605 | 2/1977 | Michael | 374/133 X |
| 4,042,885 | 8/1977 | Rhodes, Jr. | 330/9 |
| 4,045,670 | 8/1977 | Anderson et al. | 374/129 |
| 4,047,435 | 9/1977 | Keith | 374/178 |
| 4,092,862 | 6/1978 | Taylor | 374/112 X |
| 4,111,717 | 9/1978 | Baxter | 374/133 X |
| 4,290,023 | 9/1981 | Greenfield | 330/9 |
| 4,301,682 | 11/1981 | Everest | 374/121 X |
| 4,306,196 | 12/1981 | Marsh | 330/9 |
| 4,322,687 | 3/1982 | Dwarakanath | 330/9 |

OTHER PUBLICATIONS

"Digital and Analog Circuits and Systems," by Jacob Millman, Microelectronics ©1979, pp. 404–406.

Publ. "Model 1M Thermopile Detector," Dexter Research Center, 2 pages, Jul. 1978.
Publ. "FETs as Voltage-Controlled Resistors," 1979, Siliconix Inc., Handbook pp. 6-39 to 6-47.

Primary Examiner—Daniel M. Yasich
Attorney, Agent, or Firm—Freilich, Hornbaker, Rosen & Fernandez

[57] ABSTRACT

A portable, battery operated noncontact temperature measuring device including a lens for collecting infrared radiation and a thermopile for producing a signal indicative of the intensity thereof. The thermopile signal is amplified, linearized and summed with an ambient temperature signal derived from a temperature responsive element, e.g. a diode chip mounted immediately adjacent a cold junction of the thermopile. The resulting composite temperature signal is then processed and displayed. The ambient temperature signal is also utilized to control the impedance of a dual field effect transistor, which in turn controls the gain of the amplifier. Thus, temperature induced variations in the responsivity of the thermopile are compensated by corresponding changes in the gain of the amplifier. An adjustable high impedance bias circuit provides bias current to the input of the amplifier, insuring that the signal at the output of the amplifier will not be affected by temperature induced changes in the internal resistance of the thermopile. A switching circuit alternately connects the output of the thermopile and a resistor having a resistance approximately equal to the internal resistance of the thermopile to the input of the amplifier. When the resistor is so connected, an automatic zeroing circuit reduces the amplifier output to approximately zero, thereby essentially eliminating amplifier drift.

12 Claims, 10 Drawing Figures

NONCONTACT TEMPERATURE MEASURING DEVICE

BACKGROUND OF THE INVENTION

This invention relates generally to temperature measuring apparatus and more particularly to improvements in portable, battery operated, noncontact temperature measuring devices.

Devices for measuring the temperature of remote bodies by noncontact means are well known. Typically, such devices sense and respond to infrared energy radiating from the body. The intensity of such radiation is indicative of the temperature of the body. The following U.S. Patents disclose exemplary temperature measuring devices:

U.S. Pat. No. 3,430,077: BARGEN
U.S. Pat. No. 3,461,380: McGHEE
U.S. Pat. No. 3,535,523: WUNDERMAN, et al.
U.S. Pat. No. 3,722,283: TREHARNE, et al.
U.S. Pat. No. 3,761,713: MERRILL
U.S. Pat. No. 3,780,585: MILO
U.S. Pat. No. 3,791,217: STOUT, et al.
U.S. Pat. No. 3,855,864: DOUGLAS
U.S. Pat. No. 3,921,453: PLATZER, JR.
U.S. Pat. No. 4,111,717: BAXTER
U.S. Pat. No. 4,133,700: HOLLANDER, et al.

A typical noncontact temperature measuring device includes a radiation detector, e.g. a thermopile, for providing a signal indicative of infrared radiation intensity. The detector signal is typically summed with a signal indicative of ambient temperature, i.e. the temperature at the thermopile cold junction, to develop a composite temperature signal indicative of the temperature of the radiating body. In such a device, in order to achieve accurate and rapid temperature readings, it is normally necessary to either control and stabilize the operating temperature of the detector or provide means for compensating for temperature excursions which may be attributable to ambient temperature variations or locally induced thermal effects.

In a portable, battery operated device, it is not practical to provide an adequate temperature control system because of the relatively large amounts of power required. Thus, it is more typical to provide some type of temperature compensation circuitry, which generally relies upon the use of a temperature sensor, such as a thermistor or solid state transducer to measure the departure of the thermopile cold junction temperature from a reference level. However, because of the relative bulk and thermal mass of such thermistors and transducers, they are generally unable to track the cold junction temperature variations with sufficient speed and precision.

SUMMARY OF THE INVENTION

The present invention is directed to an improved noncontact temperature measuring device and more particularly to improved temperature compensating and signal processing circuitry therefor.

In accordance with one aspect of the invention, in order to precisely and rapidly track temperature variations of the cold junction of a thermopile, a temperature sensor is mounted within the housing of the thermopile tightly thermally coupled to the thermopile cold junction.

In the preferred embodiment of the invention, the temperature sensor comprises a diode chip or die affixed directly to the thermopile substrate by a thermally conductive adhesive, such as a suitable gold paint.

In accordance with another aspect of the invention, a signal derived from the temperature sensor is utilized to compensate for temperature induced variations in the responsivity of the thermopile.

In accordance with a further aspect of the invention a fully electronic means is provided to compensate for amplifier drift. Such means avoids the use of mechanical devices, such as shutters, previously employed to zero the radiation detector input.

In accordance with a still further aspect of the invention, a high impedance amplifier bias current compensation circuit prevents variations in amplifier output due to temperature induced variations in the internal resistance of the thermopile.

In the preferred embodiment, the temperature sensor signal is used to compensate for thermopile responsivity variations by varying the gain of an amplifier to which the thermopile output signal is applied. Amplifier drift is compensated for by alternately electronically connecting the thermopile and an equivalent resistor to the amplifier input. The amplifier bias current is modified while the equivalent resistor is connected to the input to zero the amplifier output.

The novel features that are considered characteristic of this invention are set forth in the appended claims. The invention will best be understood from the following description when read in connection with the accompanying drawings.

BRIEF DESCRIPTION OF THE DRAWINGS

FIG. 4 is a front elevation view, broken away, of the thermopile of FIG. 3.

DETAILED DESCRIPTION

Figures 1, 2, 3:
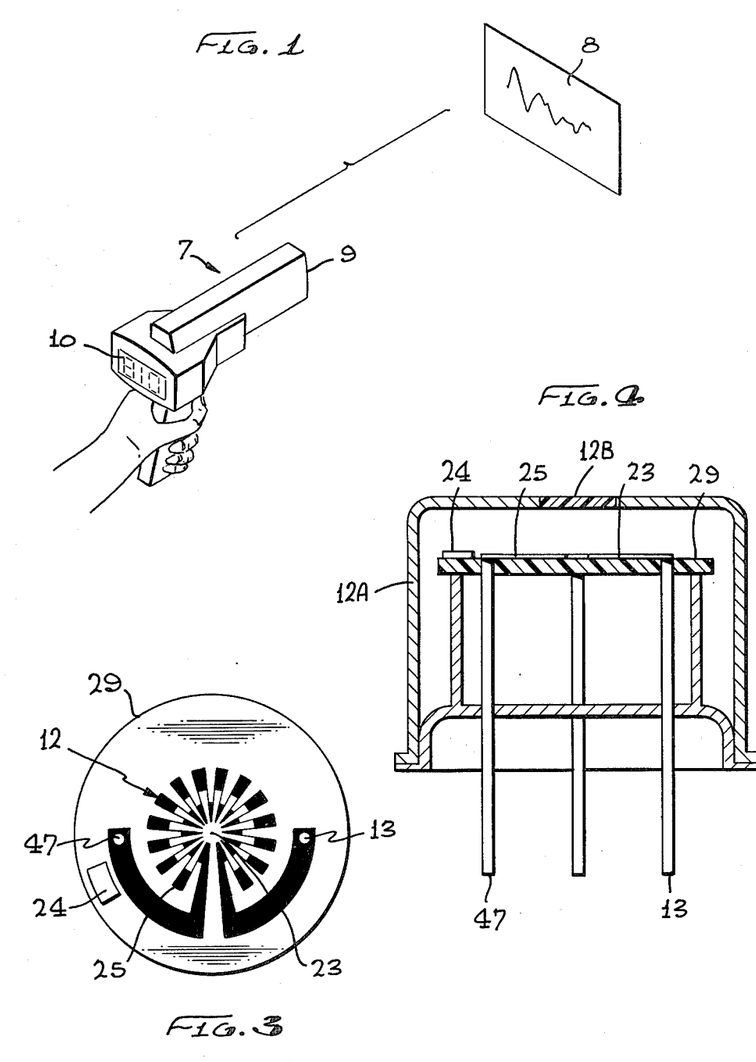
FIG. 1 is a perspective view of a typical hand held battery operated noncontact temperature sensor.
FIG. 2 is a block diagram of the temperature measuring device.
FIG. 3 is a plan view, broken away, of a typical thermopile.
Figure 2:
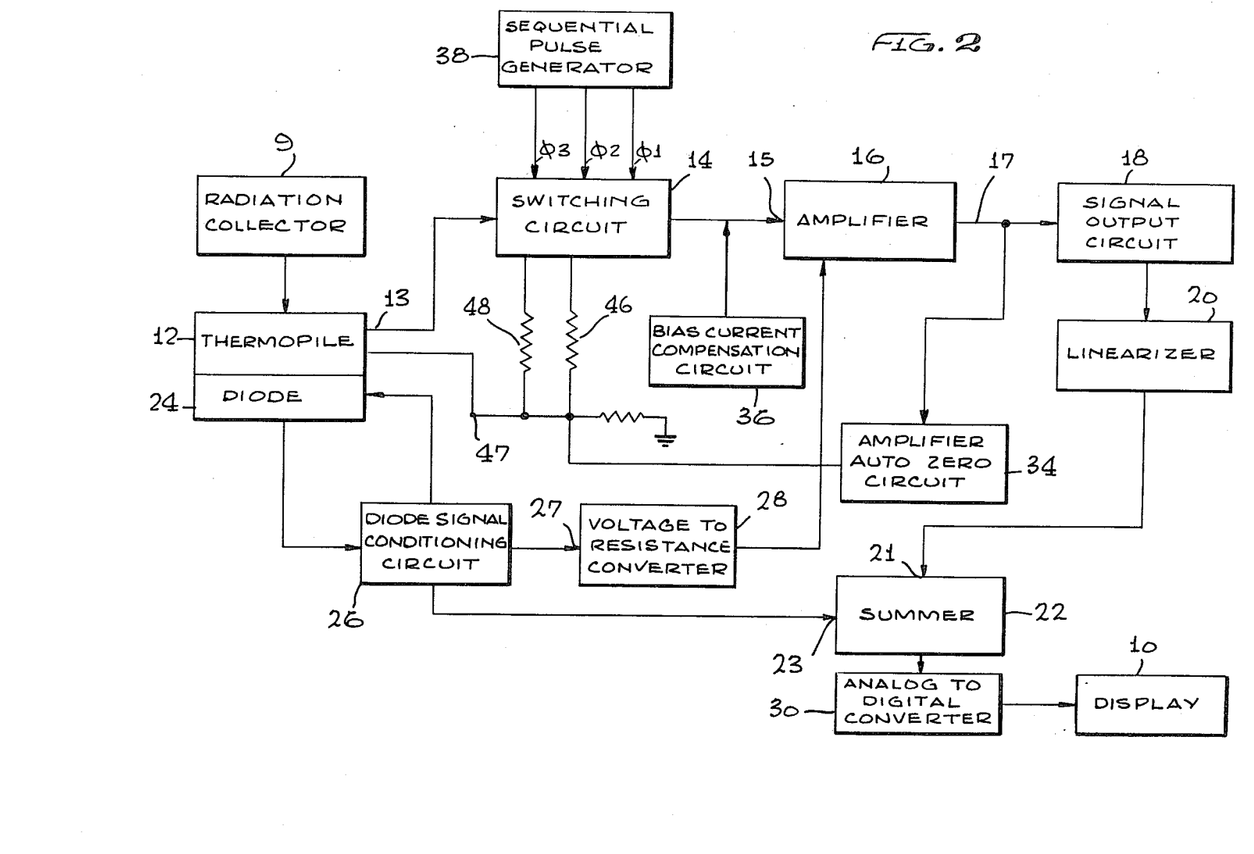

Attention is initially directed to FIG. 1 which depicts a typical hand held, battery operated noncontact temperature measuring device 7. The temperature of an infrared radiation source 8 is measured by aiming the radiation collector 9 of the device 7 thereat as shown. As will be explained hereinbelow, the device will produce an indication of the temperature of source 8 at display 10 which typically comprises an LED or LCD component.

Attention is next directed to FIG. 2 which is a block diagram of a noncontact temperature measuring device in accordance with the invention.

A radiation collector 9 comprising a conventional lens or mirror arrangement collects infrared radiation emanating from a body whose temperature is to be measured. The collector 9 focuses the radiation upon a thermopile 12 which has hot (exposed to radiation) and cold (shielded from radiation) junctions. Radiation impinging upon the hot junction of the thermopile 12 will typically raise the temperature of the hot junction above that of the cold junction and produce a signal at the output 13 of the thermopile 12 related to the difference in temperature at the hot and cold junctions. The physical configuration of an exemplary thermopile detector will be discussed hereinafter in connection with FIGS. 3 and 4.

The thermopile output signal 13 varies as a known function of the intensity of infrared radiation impinging upon the hot junction and may be utilized to determine the difference between the temperatures of the body and of the cold junction. As will be explained hereinbelow the thermopile output signal is linearized and summed with a signal indicative of the ambient temperature at the cold junction to produce a composite signal proportional to the temperature of the body with respect to a known reference.

The output signal of thermopile 12 is intermittently coupled through switching circuit 14 to the input 15 of amplifier 16. The output signal from amplifier 16 is processed through a conventional signal output circuit 18 which includes a conventional sample and hold circuit for providing a continuous signal to linearizer 20. As is well known, the linearizer 20 corrects for any nonlinearities in the response curve of thermopile 12. The output signal of linearizer 20 is, therefore, a continuous substantially linear representation of the temperature difference between the body being measured and the cold junction of thermopile 12. The linearizer output signal is coupled to a first input 21 of summer 22.

Attention is now directed to FIG. 3 which depicts the interconnections between the hot and cold junctions of a typical thermopile 12 of a conventional thermopile detector, such as the Model 1M manufactured by Dexter Research Center of Dexter, Mich. In that detector, the thermopile 12 is mounted on a ceramic substrate 29 supported in a container such as a TO-5 can 12A. The container includes a window 12B which exposes the thermopile hot junctions 23 to radiation but shields the cold junctions 25. The thermopile hot and cold junctions are interconnected in a conventional series arrangement between a positive or output terminal 13 and a negative or reference terminal 47.

Prior art devices employ ambient temperature sensing and compensation means such as thermistors or other solid state devices affixed to the outside of the thermopile container or in close proximity thereto. Such devices have inherent inaccuracies associated therewith because of the physical spacing between the ambient temperature sensing device and the thermopile junctions and because such devices are relatively massive, resulting in a time lag between ambient temperature change and the initiation of a compensating signal, response speed being inversely proportional to the mass of the ambient temperature sensing device.

Figure 6:
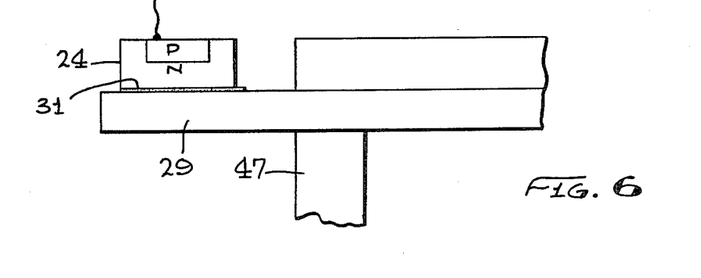
FIG. 6 is a front elevation view, broken away, of a portion of the thermopile of FIG. 3, showing the placement of the temperature sensor.

In the preferred embodiment of the present invention a significant reduction in such inaccuracy is achieved by utilizing a very low mass diode chip or die 24 as the ambient temperature sensing means. Diode 24 is mounted upon the ceramic substrate 29 common to the hot and cold junctions in a position closely proximate to the cold junctions 25 as shown in FIGS. 3, 4 and 6. The low mass of diode 24 provides significantly increased response speed compared to prior art devices and the mounting of the diode 24 upon the common substrate 29 assures tight (i.e., excellent) coupling between diode 24 and cold junctions 25. FIG. 6 depicts the placement of diode 24 in the preferred embodiment, affixed to substrate 29 with a gold paint layer 31, to insure optimum thermal conductivity therebetween. When properly biased by diode signal conditioning circuit 26, diode 24 produces an output voltage which varies in substantially linear relationship with temperature over the useful temperature range of the device (approximately −30 degrees centigrade to +60 degrees centigrade). In the present embodiment, the diode 24 produces an output voltage which varies essentially 2.6 mv/degree C. The signal from diode 24 is coupled through diode signal conditioning circuit 26 which provides conventional low current biasing for diode 24, and also produces first and second ambient temperature compensation signals. The first ambient temperature compensation signal is the 2.6 mv/degree C. output signal from diode 24 which is coupled to the input 27 of voltage to resistance converter 28. The second ambient temperature compensation signals is an essentially linear 1 mv/degree C. signal which is coupled to a second input 23 of summer 22. It should be noted that diode 24 and the circuitry associated therewith could be replaced by a similar circuit utilizing a low mass thermistor or other solid state temperature sensing device provided the mass of such device was sufficiently low to provide the necessary speed of response to changes in ambient temperature.

Summer 22 is a conventional summing circuit which combines the linearized thermopile output signal from linearizer 20 with the second ambient temperature compensation signal from diode signal conditioning circuit 26. The summer output composite signal is thus indicative of the temperature of the body with respect to some predetermined reference level. The summer output signal is processed by a conventional analog to digital converter 30 the output of which is coupled to display 10.

Voltage to resistance converter 28 receives the first ambient temperature compensation signal from diode signal conditioning circuit 26, and utilizes the signal to vary the gain of amplifier 16 in order to compensate for variations in the output signal of thermopile 12 caused by ambient temperature induced variations in the responsivity thereof.

Amplifier auto zero circuit 34 assures substantially driftless operation of amplifier 16 by periodically reducing the amplifier 16 output signal to zero under no input signal conditions. Bias current compensation circuit 36 provides proper biasing current to the input 15 of amplifier 16 and thereby prevents temperature induced variations in the internal resistance of thermopile 12 from affecting the output signal of amplifier 16.

Operation of the invention is best understood when explained with reference to three distinct, sequentially recurring time frames. For ease of illustration time frame 1 will be said to occur at a time T1, time frame 2 at a time T2, and time frame 3 at a time T3. The durations of each of the time frames are essentially equal and correspond to the period of closure of solid state switches 39, 40, or 42 respectively, depicted at FIG. 5. Thus, time frame 1 begins with the closure of switch 39 at time T1 and extends until switch 39 opens at time T2. Similarly, time frame 2 begins with the closure of switch 40 at time T2 and extends until switch 40 opens at time T3 and time frame 3 begins with the closure of switch 42 at time T3 and extends until switch 42 opens at time T1 which reinitiates the time frame sequence.

Figure 5:
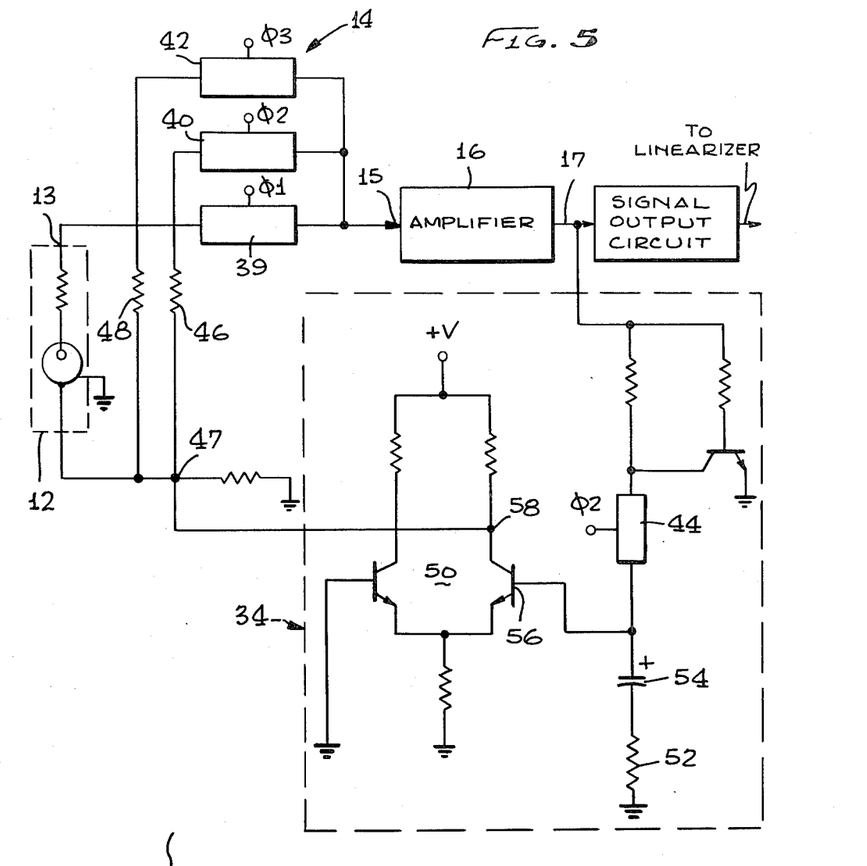
FIG. 5 is a schematic diagram of the switching and amplifier auto zero circuits.

During time frame 1, the output signal of the thermopile 12 is "read" by connecting thermopile output 13 to the input 15 of amplifier 16 via switch 39. Any output signal of thermopile 12 will thus cause a temperature indication to appear on display 10 during time frame 1. During time frame 2, the output 13 of thermopile 12 is disconnected and resistor 46 is connected to the input 15 of amplifier 16 via switch 40. During time frame 2, amplifier 16 is "zeroed" as explained in detail hereinbelow. During time frame 3, resistor 46 is disconnected and resistor 48 is connected to the input 15 of amplifier 16 via switch 42. During time frame 3, the bias current to the input 15 of amplifier 16 may be adjusted so as to prevent temperature induced changes in the internal resistance of thermopile 12 from affecting the output signal of amplifier 16.

Figure 7:
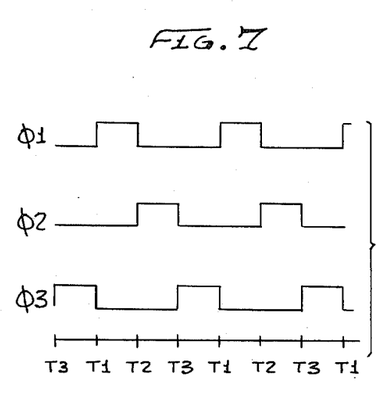
FIG. 7 is a timing diagram depicting the output of the sequential pulse generator.

Switches 39, 40, and 42 are sequenced by the output of sequential pulse generator 38 which comprises three essentially identical but time displaced pulse trains $\phi 1$, $\phi 2$, and $\phi 3$ as depicted if FIG. 7. In the preferred embodiment each pulse train comprises 300 Hz, 5-volt pulses each having a pulse width of approximately 1 millisecond. Each of the pulses of $\phi 1$, $\phi 2$, and $\phi 3$ corresponds respectively to time frames 1,2, or 3 and is time displaced from the preceding and succeeding pulse by approximately 1 millisecond, thus only one of the pulse output lines of sequential pulse generator 38 will exhibit a "1" level at any given time.

The $\phi 1$, $\phi 2$, and $\phi 3$ pulses depicted in FIG. 2 sequence the opening and closing of solid state switches 39, 40, 42 and 44 as shown in FIG. 5. Upon the occurrence of pulse $\phi 1$, at time T1, switch 39 closes, establishing time frame 1 and connecting the output 13 of thermopile 12 to the input 15 of amplifier 16. If a signal is present at the output of thermopile 12 it will be processed as explained hereinabove. At time T2, pulse $\phi 2$ appears and pulse $\phi 1$ falls to the "0" state, initiating time frame 2 and concluding time frame 1. Concurrently, switch 39 opens, disconnecting the output 13 of thermopile 12 from the input 15 of amplifier 16. Pulse $\phi 2$ causes switch 40 to close thereby connecting resistor 46 to the input 15 of amplifier 16. Pulse $\phi 2$ also causes switch 44 to close, connecting the output 17 of amplifier 16 to the input of amplifier auto zero circuit 34.

An equivalent resistor 46 having a value approximating the internal resistance of thermopile 12 is connected between thermopile terminal 13 and common reference point 47. In the preferred embodiment, thermopile 12 has an internal resistance of approximately 3K ohms at 25 degrees centigrade. Resistor 46 thus has a value of 3K ohms. Since resistor 46 is of essentially the same value as the internal resistance of thermopile 12, the substitution of resistor 46 at the input 15 of amplifier 16 has substantially the same effect as leaving thermopile 12 connected to amplifier 16 and reducing the thermopile output signal to zero.

Concurrent with the connection of resistor 46 to the input 15 of amplifier 16, amplifier auto zero circuit 34 samples the output signal of amplifier 16. Since there is no signal from thermopile 12 present at the input 15 of amplifier 16, any signal appearing at the output 17 thereof is undesirable.

Amplifier auto zero circuit 34 comprises differential amplifier 50, resistor 52 and capacitor 54. Any signal appearing at the output 17 of amplifier 16 at time T2 will cause capacitor 54 to charge and will appear at the input 56 of differential amplifier 50, producing a signal at the output 58 thereof. The signal at the output 58 of differential amplifier 50 is coupled through resistor 46 and switch 40 to the input 15 of amplifier 16. Being of the proper polarity, the signal then drives the output signal of amplifier 16 to zero. Essentially driftless operation of amplifier 16 is thus assured.

At time T3 pulse $\phi 2$ falls to zero and pulse $\phi 3$ rises, concluding time frame 2 and initiating time frame 3. Switch 40 opens and switch 42 closes, therefore resistor 46 is disconnected and resistor 48, which is also connected to common reference point 47, is connected to the input 15 of amplifier 16. For reasons to be made clear hereinbelow, the resistance value of resistor 48 is several orders or magnitude greater than that of resistor 46.

Figure 8:
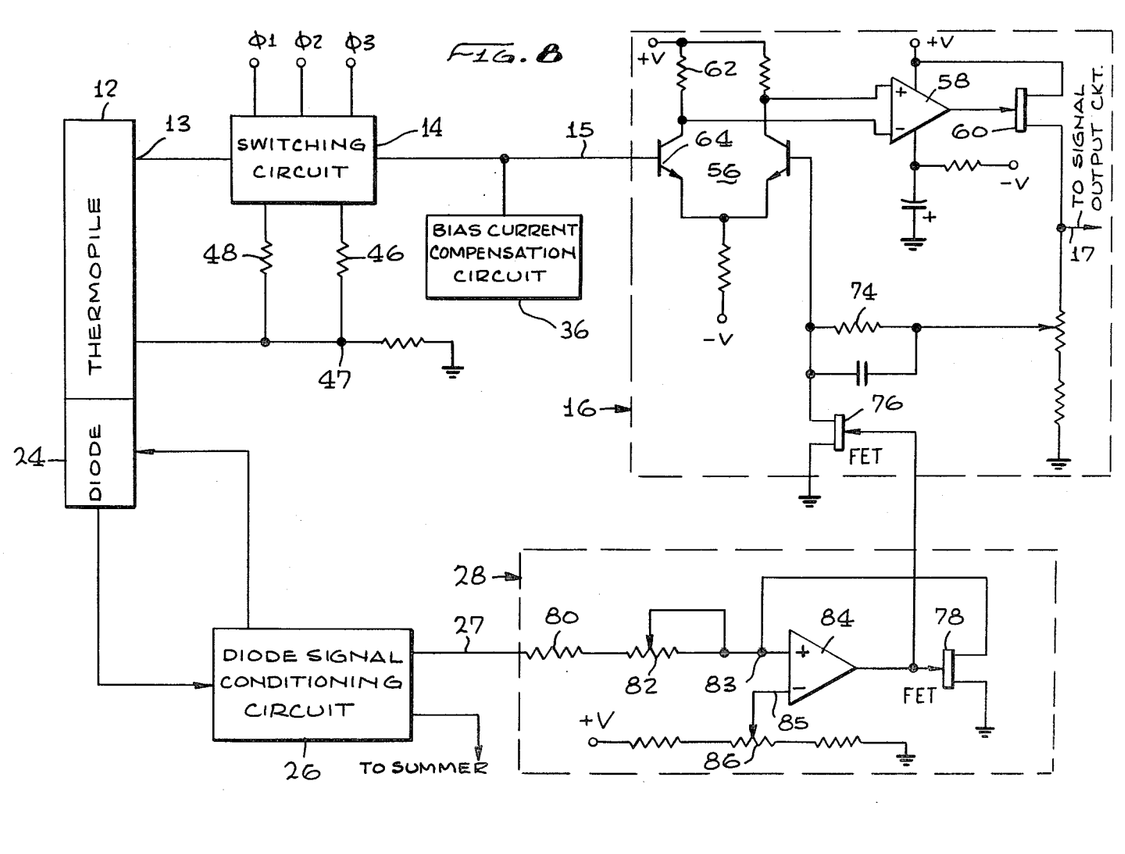
FIG. 8 is a schematic diagram of the amplifier and the voltage to resistance converter.
Figure 9:
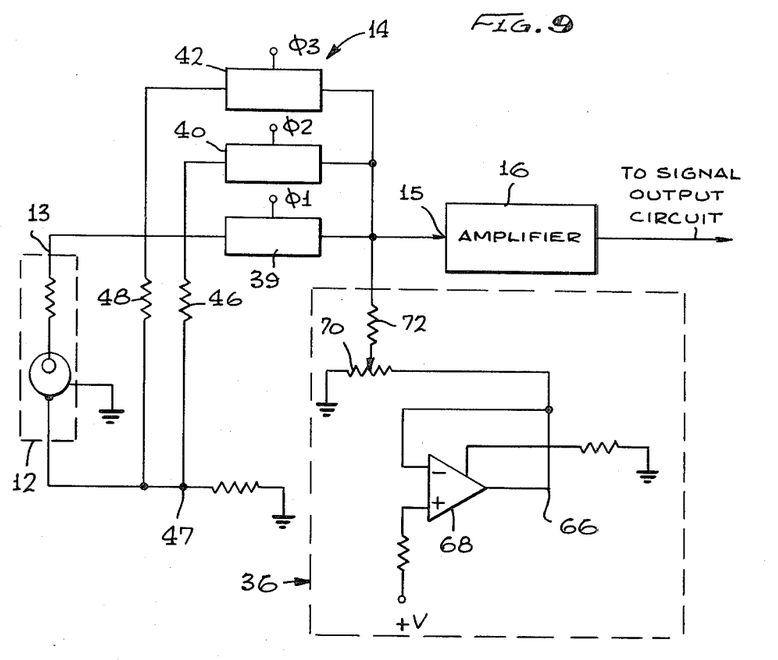
FIG. 9 is a schematic diagram of the switching and the bias current compensation circuits.

Reference is now directed to FIGS. 8 and 9. FIG. 8 depicts amplifier 16, which is a cascade amplifier comprising first stage differential amplifier 56 and second stage amplifier 58. The output of amplifier 58 is connected to the gate of field effect transistor FET 60, whose source is connected to the output 17 of amplifier 16 and whose drain is connected to a reference potential.

Under quiescent conditions a constant current Ic will flow through load resistor 62. A constant current $I_b$ to the base of transistor 64, which is the input 15 of amplifier 16, will therefore be required. $I_b$ must have a magnitude equal to the magnitude of Ic divided by the gain of the transistor. Bias current compensation circuit 36, depicted in detail in FIG. 9, is designed to supply the proper $I_b$. The output 66 of amplifier 68 supplies a constant voltage to high resistance potentiometer 70. The wiper of potentiometer 70 is adjusted, preferably during factory testing, to allow the proper $I_b$ to flow through resistor 72, which also has a high value of resistance, to the input 15 of amplifier 16. The procedure for properly adjusting potentiometer 70 is best understood by reference to FIG. 10, lines A, B, and C of which are aligned with the timing diagram of FIG. 7.

Figure 10:
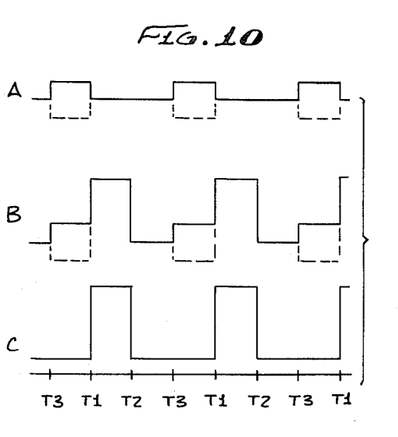
FIG. 10 is a timing diagram depicting the output of the amplifier under different bias and input signal conditions.

Line A of FIG. 10 depicts the output signal of amplifier 16 when no signal is provided by thermopile 12 and potentiometer 70 is improperly adjusted i.e. either too much (solid line) or too little current (dashed line) is flowing through resistor 72. At time T1 the amplifier output signal is zero because of the absence of a thermopile signal, at time T2 the auto zero circuit 34 suppresses any output signal which would otherwise appear as a result of current flow through resistor 46 due to the misadjustment of potentiometer 70. At time T3, however, switch 44 opens, disconnecting the auto zero circuit and resistor 46 from amplifier 16. The current which had flowed through resistor 46 must now flow through the higher valued resistor 48, causing a change in the input signal voltage to amplifier 16 which produces the pedestal shown at line A at the amplifier output 17. The pedestal may be either positive or negative, depending upon the direction of current flow through resistor 48. Line B depicts the output of amplifier 16 for the same conditions as line A with a thermopile output signal present. Line C depicts the output of amplifier 16 for the same conditions as Line B but with potentiometer 70 properly adjusted.

If potentiometer 70 is adjusted to provide the required amount of $I_b$, essentially no current will flow through resistors 46 or 48. It follows that at time T3, the input signal to amplifier 16 will remain substantially unchanged and the output signal of amplifier 16 will remain essentially zero. To provide the proper bias current $I_b$, one need merely observe the output signal of amplifier 16 and adjust potentiometer 70 until the pedestal at time T3 disappears. Since the values of resistor 72 and potentiometer 70 are high, on the order of 1 megohm each in the preferred embodiment, the input impedance to the amplifier is maintained desirably high.

The significance of proper adjustment of potentiometer 70 is that the amplifier 16 output signal will no longer be affected by significant changes in the resistance of the stage preceding the input 15 of amplifier 16. As mentioned previously, resistor 46 has a value approximating the internal resistance of thermopile 12 and resistor 48 has a value several orders of magnitude greater. In the preferred embodiment, these values are 3K ohms and 10K ohms respectively.

The internal resistance of thermopile 12 (depicted as a resistor in dashed box 12 in FIGS. 5 and 9) in the preferred embodiment varies with temperature at a rate of approximately −0.2 percent/degree C. over the range 0 degrees C. to 85 degrees C. Therefore, the total temperature induced change in resistance over that temperature range can be expected not to exceed 600 ohms. Since the amplifier output signal is not affected by the 7K ohm change in resistance between resistor 46 and resistor 48 at time T3, the output signal will not be influenced by a temperature induced change in the internal resistance of the thermopile 12 amounting to less than one tenth as much. The amplifier output signal therefore remains essentially unaffected by temperature induced changes in the internal resistance of thermopile 12.

As temperature increases, the responsivity of thermopile 12 decreases. In the preferred embodiment, the responsivity temperature coefficient of thermopile 12 is approximately −0.4 percent/degree C. Thus, in order to maintain the proper signal level at the output 17 of amplifier 16, the gain of amplifier 16 is changed by +0.4 percent/degree C. This increase and/or decrease in the gain of amplifier 16 is controlled by voltage to resistance converter 28 which compensates for such temperature induced changes in the responsivity of thermopile 12.

FIG. 8 depicts the details of both amplifier 16 and voltage to resistance converter 28. It is well known that the gain of amplifier 16 is proportional to the ratio R74/rds76 where R74 is the value of resistor 74 and rds76 is the value of drain to source (channel) resistance of field effect transistor (FET) 76. The gain of amplifier 16 can therefore be varied by varying the drain to source resistance of FET 76 (i.e., rds76). In the preferred embodiment depicted in FIG. 8, rds76 is varied by the action of converter 28. FET 76 and FET 78 preferably constitute a dual FET such that rds76=rds78. However, It should be noted that other embodiments of the invention could alternatively use separate matched The first temperature compensation signal from diode signal conditioning circuit 26 is applied to the input 27 of voltage to resistance converter 28 which is one side of resistor 80. Resistor 80 is connected to potentiometer 82 which in turn is connected to the positive input 83 of amplifier 84. The negative input 85 of amplifier 84 is connected to potentiometer 86 which is adjusted to provide the appropriate output signal from amplifier 84 as will be explained hereinbelow.

The output signal from amplifier 84 is applied to the gate of FET 78 (hence also to the gate of FET 76). Thus, as the ambient temperature related signal variations in the first temperature compensation signal are coupled to the input 27 of voltage to resistance converter 28, the signal to the gate and therefore the gate to source voltage of FET 78, is varied. The effect of the variation in such gate to source voltage is to vary rds and thereby change the gain of amplifier 16.

The value of rds is given by the formula $$rds = \frac{VB(R80 + R82)}{VD - VB}$$

where:
VB=the voltage at the negative input 85 of amplifier 84.
VD=the value of the first temperature compensation signal from diode signal conditioning circuit 26.
R80=the value of resistor 80.
R82=the value set by potentiometer 82.

Potentionmeter 86 is typically adjusted to set VB at a level calculated to provide an output signal from amplifier 84 which varies the gain of amplifier 16 by the same percentage as the responsivity of thermopile 12 changes with temperature. As can be seen, R82 can also be varied to control the change in rds with temperature.

The change in rds with respect to a change in VD is given by the formula $$\frac{drds}{dVD} = -\frac{VB(R80 + R82)}{VD^2 - 2VDVB + VB^2}$$

Thus rds is shown to vary inversely with VD and therefore, directly with thermopile 12 responsivity. Amplifier 16 gain, therefore varies inversely with thermopile 12 responsivity to maintain a constant amplifier output signal.

Thus, a remote temperature measuring device has been disclosed in which novel means to compensate for temperature induced changes in the internal resistance and responsivity of a thermopile radiation detector are provided. In addition, novel means for compensating for drift in the amplifier of a temperature measuring device and for accurately measuring the cold junction temperature of a thermopile are disclosed.

From the foregoing it should be apparent that the present invention provides a novel and useful noncontact temperature measuring device. It is recognized that different embodiments of the invention may now become obvious to those skilled in the art and the claims associated herewith are intended to include all such embodiments.

What is claimed is:

1. A noncontact temperature measuring device comprising:
   a thermopile radiation detector carried by a substrate for producing a first output signal indicative of the intensity of radiation incident thereon;
   an amplifier having a value of gain dependent upon the ratio of the value of a first impedance to the value of a second impedance;

said second impedance comprising the source to drain impedance of a first field effect transistor;

means for coupling said radiation detector output signal to the input of said amplifier;

temperature sensing means located on said substrate proximate to said radiation detector and tightly thermally coupled thereto for producing a second output signal indicative of the ambient temperature thereat; and compensation means, responsive to said second output signal, for varying said second impedance to vary the gain of said amplifier.

2. The device of claim 1 wherein said compensation means comprises a second field effect transistor having characteristics matched to the characteristics of said first field effect transistor.

3. The device of claim 1 wherein said temperature sensing means comprises a diode mounted upon a common substrate with said thermopile.

4. The device of claim 1 wherein said second output signal varies in substantially linear relationship with ambient temperature over the ambient temperature range of the device.

5. In a temperature measuring device having a radiation detector with an internal resistance associated therewith for producing a signal at the output thereof indicative of the intensity of radiation incident thereon and an amplifier for amplifying said signal, said amplifier having an input and an output, means for compensating for ambient temperature induced changes in the internal resistance of said detector comprising:

a first resistor having a value substantially equivalent to said radiation detector internal resistance and connected to a reference potential;

a second resistor having a value different from said first resistor and connected to said reference potential;

means for electronically alternately connecting and disconnecting said first and second resistors to said amplifier input;

bias current compensation means connected to said amplifier input to supply a bias current thereto; and means for adjusting said bias current to yield a substantially zero amplifier output while said first and second resistors are alternately connected to said amplifier input to thereby compensate for the ambient temperature induced changes.

6. The device of claim 5 wherein said bias current compensation means supplies essentially all of the bias current required by said amplifier and essentially none flows through said first or said second resistor.

7. A noncontact temperature measuring device for measuring the temperature of a source of infrared radiation, comprising thermopile radiation detector means including a substrate having at least one hot junction and at least one cold junction mounted thereon, respectively exposed to and shielded from said source of radiation, for producing a first output signal indicative of the intensity of radiation incident on said hot junction;

an amplifier including input means and output means;

means coupling said first output signal to said amplifier input means;

temperature sensing means located on said substrate immediately adjacent to said cold junction and thermally coupled thereto for producing a second output signal indicative of the ambient temperature thereat; and means responsive to said second output signal for varying the gain of said amplifier to compensate for temperature induced variations in said detector means.

8. The device of claim 7 wherein said temperature sensing means comprises a diode chip affixed to said substrate by a thermally conductive adhesive.

9. The device of claim 7 wherein said detector means includes a reference terminal and an output terminal and wherein said first output signal is supplied at said output terminal referenced to said reference terminal; and further including a resistor having first and second terminals and a value substantially equivalent to the internal resistance of said detector means;

means for alternately coupling said detector means output terminal and said resistor first terminal to said amplifier input means;

means connecting said detector means reference terminal to said resistor second terminal; and circuit means responsive to said amplifier output means for varying the potential at said detector means reference terminal and said resistor second terminal to reduce the signal at said amplifier output means to essentially zero to thus compensate for drift in said amplifier.

10. The device of claim 7 including a portable housing;

means mounting said radiation detector means in said housing; and radiation collector means carried by said housing for focusing radiation from said source onto said detector means.

11. The device of claim 10 further including a self contained source of electrical power therefor mounted within said housing.

12. A noncontact temperature measuring device for measuring the temperature of a source of infrared radiation, comprising:

infrared radiation detector means having an internal resistance of certain value and including a reference terminal and an output terminal for producing a signal at said output terminal indicative of the intensity of radiation from said source;

equivalent resistor means including first and second terminals and defining a resistance value substantially equal to said certain value;

an amplifier including input and output means;

means electronically alternately coupling said radiation detector means output terminal and said equivalent resistor means first terminal to said amplifier input means;

means connecting said radiation detector means reference terminal to said equivalent resistor means second terminal; and circuit means responsive to said amplifier output means for varying the potential at said radiation detector means reference terminal and said equivalent resistor means second terminal to reduce the signal at said amplifier output means to essentially zero to thus compensate for drift in said amplifier.

* * * * *